March 1, 1938.  C. W. DAKE  2,109,470
METHOD OF PRODUCING BRAKE DRUMS
Filed March 5, 1934  4 Sheets-Sheet 1
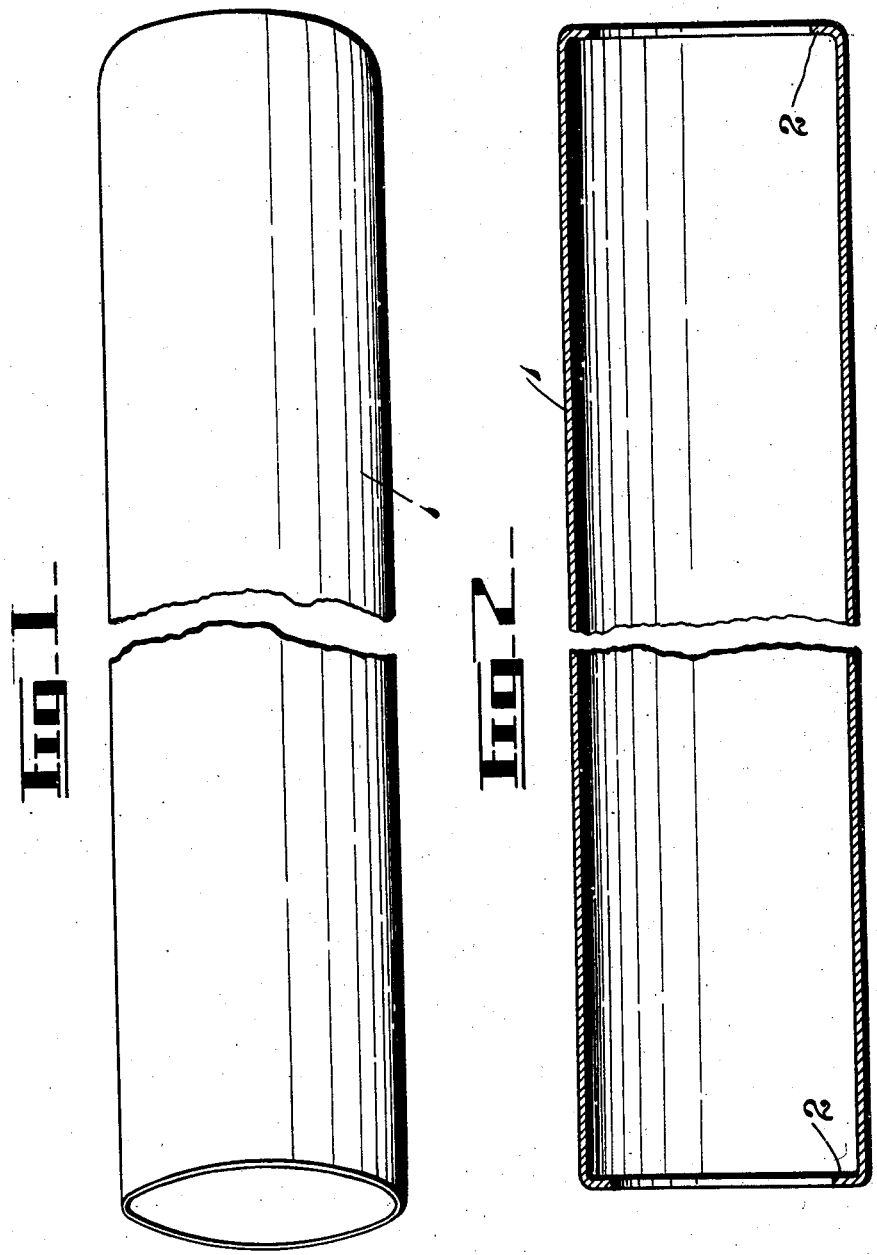
INVENTOR
CHARLES W. DAKE
BY
Liverance & Van Antwerp
ATTORNEY March 1, 1938.  C. W. DAKE  2,109,470
METHOD OF PRODUCING BRAKE DRUMS
Filed March 5, 1934  4 Sheets-Sheet 2
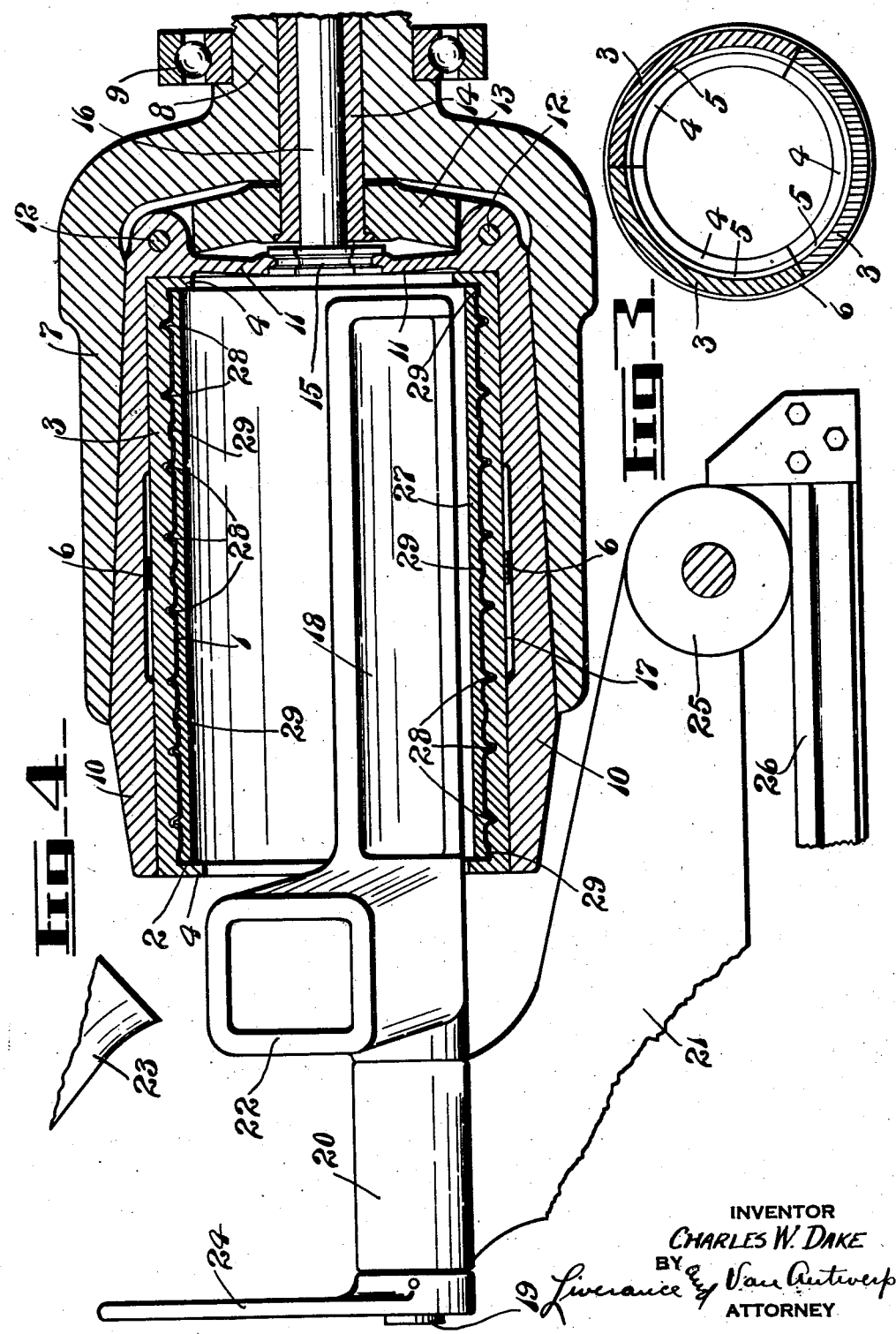
INVENTOR
CHARLES W. DAKE
BY
ATTORNEY March 1, 1938.  C. W. DAKE  2,109,470
METHOD OF PRODUCING BRAKE DRUMS
Filed March 5, 1934  4 Sheets-Sheet 3
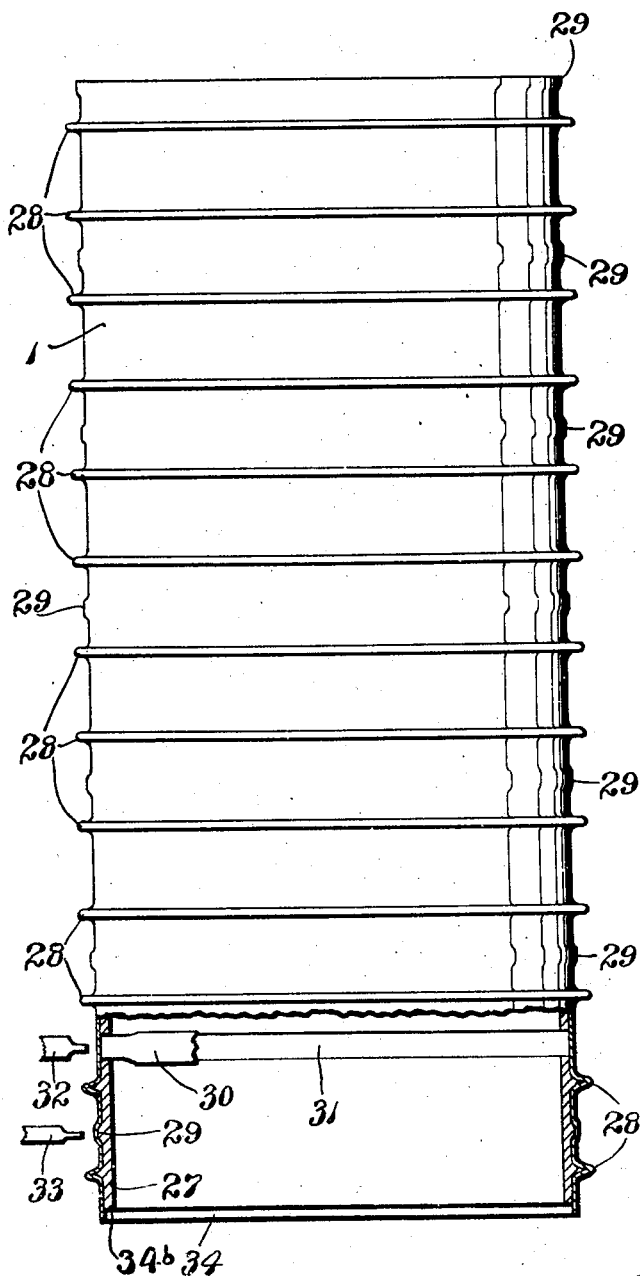
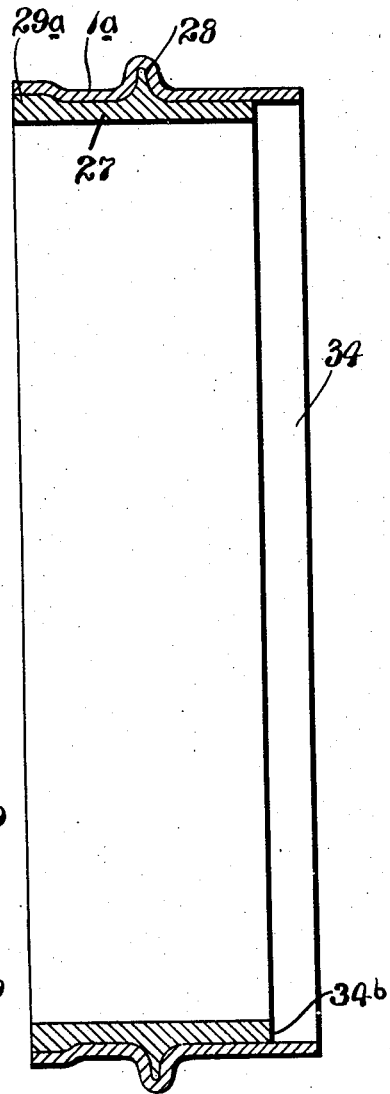
INVENTOR
CHARLES W. DAKE
BY
Liverance & Van Antwerp
ATTORNEY March 1, 1938.          C. W. DAKE          2,109,470
METHOD OF PRODUCING BRAKE DRUMS
Filed March 5, 1934          4 Sheets-Sheet 4
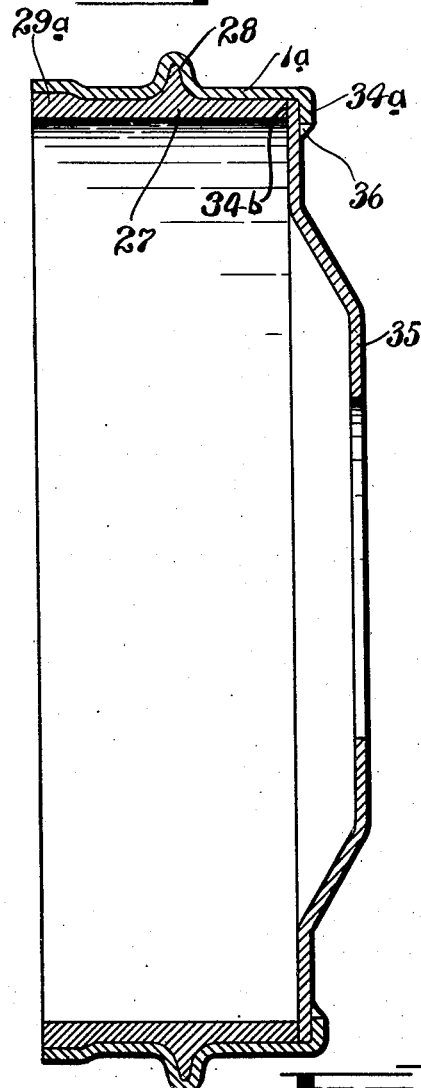
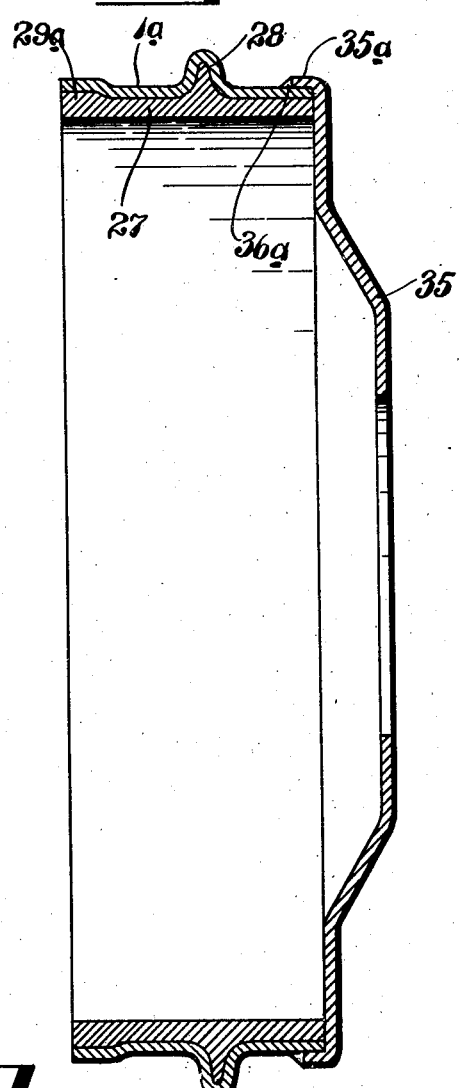
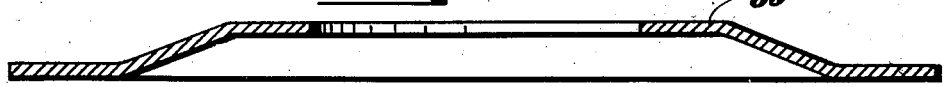
INVENTOR
CHARLES W. DAKE
BY
ATTORNEY Patented Mar. 1, 1938

2,109,470

UNITED STATES PATENT OFFICE 2,109,470

METHOD OF PRODUCING BRAKE DRUMS

Charles W. Dake, Grand Haven, Mich., assignor to Campbell, Wyant & Cannon Foundry Company, Muskegon Heights, Mich., a corporation of Michigan Application March 5, 1934, Serial No. 714,089

18 Claims. (Cl. 29—152.2)

This invention relates to brake drums and, particularly, to a novel and economical method of producing brake drums for motor vehicles. Such brake drums are employed in conjunction with other braking mechanism for retarding and stopping the rotative movement of wheels on vehicles. The brake drums, of course, may be used in many other relations, connected with rotating mechanism and utilized by the application of a brake thereto to retard or stop such mechanism.

Brake drums of the character to be produced by my invention should be of light weight but resistant to fracture, readily conduct away heat generated by the friction of brake shoes thereagainst, and of a character produced at a sufficiently low cost to be practical and acceptable. One important feature and object of the present invention is to provide a method of producing such brake drums very rapidly and in mass production with a resultant substantial uniformity of product and economy in cost.

Cast iron is a material which has exceptional qualities for braking, producing high and smooth braking characteristics. Cast iron employed as the braking or wearing face of brake drums, because of its relatively brittle nature, should be supported or backed by a metal of a tougher and ductile nature, such as steel, to prevent fracture of the iron from sudden shocks. The use of a steel backing also permits the forming of brake drums of a much lighter weight than if the same were made entirely of cast iron. The surface of the cast iron, upon which the brake lining or shoes bear must be smooth, free from pits or other holes, cracks or sponginess, and further free from foreign material, such as slag or dirt. The present invention has for one of its objects and purposes the production of a large quantity of centrifugally cast iron lined brake drums in a single casting operation, so far as the casting is concerned, and with the iron properly intermolecularly joined to and with an outer supporting backing of steel, and with the production of the proper quality of iron, free of imperfections such that the same is suitable for brake drums, particularly on motor vehicles wherein the drums are subjected to severe usage.

An understanding of my invention, whereby the practical and successful attainment of the objects stated is secured, as well as others not at this time enumerated, may be had from the following description, taken in connection with the accompanying drawings, in which, Fig. 1 illustrates an elongated and relatively thin cylindrical metal tube such as may be rolled or drawn or otherwise formed to tubular shape.

Fig. 2 is a longitudinal section of the tube with its two ends flanged inwardly to provide annular dams against molten metal escaping from the ends of the tube and becoming fused to the mold.

Fig. 3 is a transverse section of a metal mold for holding the tube shown in Fig. 2, said tube later to receive molten metal, preferably cast iron.

Fig. 4 is a fragmentary longitudinal vertical section of a form of apparatus by which the mold with the metal tube therein may be held and rotated, and receive molten metal to be distributed over the inner peripheral face of the tube centrifugally.

Fig. 5 is an elevation, partly in longitudinal section, showing the finished tube lined with cast metal, such as cast iron, after the casting process has been performed, and further indicating the steps by which the tube is transversely cut to provide brake drum rings.

Fig. 6 is a brake section or ring, a plurality of which are produced upon cutting the tube and cast lining therein in accordance with my invention.

Fig. 7 is a sheet metal supporting back to be used in completing the brake drum.

Fig. 8 is a central vertical section through a completed brake drum of preferred construction showing the attaching of the supporting back to the brake drum ring, and Fig. 9 is a similar section of a completed brake drum, showing an alternate form of construction and method of attaching the supporting back to the brake drum ring.

Like reference characters refer to like parts in the different figures of the drawings.

In carrying out the method which I have invented, an elongated tube 1 of a ductile metal, such as low carbon steel, is provided. The material used is such as is readily shaped and formed when it is heated to a comparatively high degree of temperature. This tube, in pursuance of my method, at its ends is first formed with flanges 2. The depth of the flanges is greater than the thickness of the cast metal lining which is to be cast at the inner peripheral surface of the tube and provides dams against the molten iron contacting the end flanges of the mold and becoming attached thereto, preventing removal of the tube from the mold.

A mold in a plurality of sections, three of such sections being shown in Fig. 3, is made of a shape such that when the sections are secured together it receives and snugly holds the tube 1. The mold sections 3, at each end, are provided with flanges 4 which, when the sections of the mold are assembled as in Fig. 3, provide a continuous annular flange at each end of the mold. At a plurality of spaced apart points in the length of the mold sections and at the inner side thereof, grooves 5 are cut making continuous grooves in the assembled mold parallel to each other and lying in transverse vertical planes. The flanges 2 at the ends of the tube 1 bear against the inner sides of the flanges 4 of the mold. The sections of the mold are held together by a metal band 6 which may be releasably clamped around the same thus enclosing the tube 1 within the mold. The mold sections are preferably made of steel which may be machined and finished to a desired inner surface and in which the grooves 5 are easily cut. Between alternate grooves 5 shallow and relatively wide depressions (not numbered) are likewise cut at the inner side of the mold sections, the purpose of which will hereafter appear.

The mold with the tube 1 therein is placed in a rotatable fixture or chuck. This fixture includes a head 7 having inwardly tapered sides and carried at the end of a shaft 8 mounted for free rotation in suitable bearings 9, one of which is shown. The chuck comprises a plurality of jaws 10 at the inner ends of which are inwardly extending radial arms 11. These shoes are pivotally mounted at 12 on and between ears extending from a head 13 in turn secured at the end of a rotatable hollow shaft 14. The inner ends of the arms 11 have an operative connection with a grooved head 15 fixed at the end of a longitudinally movable rod 16 which passes through the hollow shaft 14. The jaws 10 of the chuck at their inner sides and at their intermediate portions between their ends are recessed with a shallow recess 17 whereby the clamping band 6 has provided space for its reception. The mechanism described herein is similar to that shown in the patent to Campbell, No. 1,917,872, issued July 11, 1933, differing therefrom essentially only in the length of the outer head 7 and the jaws 10 which are elongated to receive and clamp upon the mold within which the sheet metal tube 1 is held. The opening of the jaws by outward projection of the tubular shaft 14 and the rod 16 and their contraction by the inward movement thereof is upon the same principle of operation fully disclosed in the above identified patent. It should be understood, however, that the particular machine forms no part of this invention and that other types of machines that may be suitable for revolving molds at high rotative speed can be employed.

After a mold with a sheet metal tube 1 therein has been placed within the chuck jaws and the jaws retracted into the head 7 it is in condition for rotation about the longitudinal axis of the tube and for the pouring of the molten metal therein. As previously stated the tube preferably is of a low carbon steel. The molten metal to be poured therein in practice is an alloy of cast iron.

The molten metal poured or deposited within the tube is poured thereinto from an elongated trough 18 which extends nearly the full length of the tube 1. Beyond the trough and integral therewith there is provided a stud shaft 19 for rotatably mounting the same in a bearing 20 carried at the upper end of a bracket 21. A guiding spout 22, through which the molten iron may be poured from a ladle 23, is suitably cast with the trough 18 so that the molten iron poured into the spout 22 flows directly into the trough 18. The trough is filled to the necessary depth with molten iron and at such time is located with its open side up and in a substantially horizontal plane.

The trough is turned about the axis of the stud shaft 19 by means of a handle 24 secured thereto which may be manually operated to turn the trough and tip the same so that the molten iron therein flows in a thin sheet over the full length of the trough into the sleeve 1. The mechanism, which carries the mold and the sleeve 1, is rotating as the iron is poured into the tube and is given a progressive speed of rotation while the iron is being poured and after pouring has been completed. This serves to cause the molten iron to be evenly distributed over the inner peripheral surface of the long tube 1 and to press strongly outwardly against the wall of the tube by reason of the centrifugal forces generated. It is, of course, evident that the flanges 2 at the ends of the tube 1 serve as dams to prevent the molten metal from spilling out at the ends of the tube.

The mold and the tube preferably before the same are placed within the chuck jaws 10 are heated to a sufficiently high temperature that when the molten iron strikes thereagainst it will not be chilled or solidified. In practice the molten iron should be of a very high temperature and a good working range for the molten iron is between 2700° and 3100° F. with the mold and tube heated to between 500° and 1100° F. This produces excellent results with the final peripheral speed of the tube at 3000 to 4000 lineal feet per minute. It is, of course, to be understood that higher temperatures of the tube and mold permits the use of a somewhat lower temperature of the molten iron, and conversely a higher temperature of the molten iron permits the use of a lower temperature for the tube and the mold which contains it. Also, the higher temperatures of the tube and mold permits the use of a somewhat slower speed of rotation and vice versa. Because of the heat capacity of the mold, greater than the heat capacity of the metal tube alone, it is not so essential to heat the tube and mold to what would be a necessary temperature if the tube alone was heated, and in some cases where the temperature of the molten metal is high, somewhat above 2800° F., it has been found it is not necessary to heat the tube beyond the temperature of the surrounding atmosphere.

The very high temperature of the molten iron used causes an increase in temperature of the tube when the molten iron comes thereagainst, with a resultant softening of the metal of the tube such that the pressure of the molten iron against the wall of the tube produces a deformation of the tube and a pressing of metal of the tube into the grooves 5 of the mold; and also into the shallow recessed grooves to which previous reference has been made.

There is thus provided a structure which consists of the elongated steel outer tube 1 having a lining 27 of cast iron therein, of substantially uniform thickness and with spaced apart continuous ribs 28 extending outwardly and formed in the steel tube, the inner sides of said ribs being filled with the iron. Also, the shallow recess between alternate grooves 5 in the mold have the metal of the tube pressed outwardly therein making shallow annular projections 29 likewise filled with iron. With the high temperatures of iron used and with the temperature of the mold and tube initially sufficiently high that the molten iron coming thereagainst is not chilled or solidified, and with the high rotative speeds used and the great heat capacity of the mold, the tube 1 and the molten iron have effected a substantially integral molecular joinder of the cast iron and the steel tube throughout their opposed contacting surfaces.

In order that this integral molecular joinder, that is, a fusion, of the cast iron and steel of the tube shall take place when the molten iron is poured into the tube 1, the inner surface of the tube is initially cleaned and has applied thereto a protective covering or coating which serves to exclude oxygen of the air contacting the tube when the tube is heated, thus preventing any oxide scale being produced at the inner surface of the tube. The centrifugal action described has the effect of forcing the heavy materials outwardly and any lighter materials inwardly, such that there will be produced a dense quality of cast iron and gases produced in and by the melted iron coming into contact with the protective coating used and any slag, dirt or foreign matter in the iron being forced by the difference in centrifugal caused by the difference in specific gravity to the inner side of the lining 27, where the gases escape and any solid foreign matter becomes a part of a scale which is eventually machined away.

After the casting operation has been performed and the molten iron has solidified and as soon as the product made and the mold which encloses it is in proper condition to handle they are taken from the chuck, the mold removed and the ribbed steel tube with the cast iron lining having an integral fused union therewith is allowed to cool. It is then subjected to machining operations to obtain therefrom a plurality of individual brake drum rings.

The first machining operation after the lined tube is removed from the mold is to cut the flange 2 away from the end of the tube allowing the steel tube to extend beyond the cast iron forming the shoulder 34b and the projection 34 after which the first brake drum band is cut from the tube at one of the enlargements 29 by the cutter 33. The cast lining of the tube is then cut to form a groove the width of two of the lips or projections 34 plus the width of cutter 32 and the second drum band is cut from the tube. Thereafter the lined tube is brought in position for the third drum band to be cut from the tube by the cutter 32 and the third drum band is then cut from the tube and a repetition of these operations is carried on until the tube has been cut into a plurality of single brake drum shells, each provided with a projection 34 and shoulder 34b at one side and a plain cut enlargement at the opposite side. These operations are indicated in Fig. 5 of the drawings, and while the preferred cutting of the tube is into a plurality of single width brake drum bands nevertheless they may be cut into a plurality of two or more width drum bands by first cutting the flange 2 away at one end of the tube as previously; thereafter subjecting the lining 27 to successive cutting operations as by the tools 30 and 32 at spaced intervals making annular grooves 31 in the lining, leaving the metal shell intact; then cutting the outer tube shell as by the narrow cutting tool 32 midway between the sides of the grooves 31 whereby double width drum bands are provided; machining the inner periphery of the lining 27 either before or after it is separated into single drum rings and cutting the double width bands midway of their width into single brake drum bands.

The drum is completed by machining the inner peripheral surface of the cast lining and applying a metal supporting back 35 thereto. The back is in the form of an annular dished disk of sheet steel having a central opening therein and with the central portion of the disk offset to one side, this being produced in a press in the usual and well known manner. The back has an exterior diameter such as to fit within the annular projecting end portion 34 and bear against the adjacent shoulder 34b of the lining 27. The annular projecting portion 34 is then bent inwardly making a continuous annular flange 34a embracing back 35 to which this flange 34a is welded at the joint 36, thereby providing a complete brake drum ready for attachment to a wheel.

In Fig. 9 an alternate form is shown. In such case the projecting portion 34 is not provided at one end of the brake drum ring but the edges of the lining 27 lie flush with the edges of the sheet metal shell 1a around the lining. The back 35 is made with a larger diameter so that its peripheral portions extend beyond the shell 1a to be turned at right angles and make a continuous annular flange 35a which extends over one end of the shell 1a. The parts are welded together at the joint 36a as shown.

By the method described a large number of brake drum rings connected together in alinement are provided with a single casting operation, and the individual brake drum rings are separated from each other by machining as described. The tube 1 needs no rolling or preforming to produce the annular heat disseminating ribs 28 therein, as such rings are automatically provided by the method which I have described. It is, of course, to be understood that the method which I have provided is not restricted to producing the annular ribs 28 in the manner described as the same may be produced initially in the tube 1 before it is placed in the mold. However, it is a simpler and more economical process to automatically produce such ribs as described. With my invention large quantity production at the lowest cost is attainable. The temperature of the steel tube and of the molten iron is such as to produce an intermolecular joinder of the steel and iron at their contacting surfaces and make a true fusion thereof. The temperatures given are subject to variation. If necessary, the steel and the mold can be raised to a higher temperature than 1100° F. without damage from deformation. A temperature of cast iron in the neighborhood of 3000° F., however, is sufficiently high that a fusion joinder of the cast iron with the steel will take place particularly under the conditions herein described with the steel in the neighborhood of the temperatures specified.

Having thus described my invention, what I claim and desire to secure by Letters Patent is:

1. The herein described process which consists in providing an elongated cylindrical mold having spaced apart annularly extending grooves around the inner peripheral face thereof, holding an elongated cylindrical metal tube within said mold, said tube having at each end an annular flange, heating the tube and mold to a high degree of temperature, rotating the mold and tube at high speed about the longitudinal axis of the tube, and depositing molten metal heated to a temperature in excess of its melting temperature within the tube as the same is rotating whereby a lining of metal over the inside of the tube is produced and spaced apart annular ribs filled with metal formed in the tube around the same through pressure exerted by the centrifugal force of the molten metal under the high speed of rotation, as specified.

2. The herein described method which consists of the steps recited in claim 1, together with additional steps comprising cutting the composite structure formed of tube and solidified molten metal transversely across between said annular ribs, thereby providing brake drum rings having an outer supporting shell of sheet metal and an inner wearing band of cast metal integrally fused thereto.

3. The method of producing a brake drum ring which consists in providing a cylindrical mold having an interior annularly extending groove, locating and holding an outer shell of thin steel in said mold, said shell being of cylindrical form, rotating said mold and shell, and depositing a molten iron alloy in the shell while it is rotating whereby the molten iron is distributed over the inner face of the shell by centrifugal action, and the shell is deformed into and substantially fills the groove in the mold, as specified.

4. The method of producing brake drums, which includes providing a tube of thin steel, said tube having inturned annular flanges at its ends, placing said tube in a mold, said mold having annular grooves therein spaced apart from each other distances equal substantially to the width of a single brake drum, heating said mold and tube to a high degree of temperature, rotating the mold and tube at a high speed about their longitudinal axis, depositing molten iron in said tube while rotating at a temperature within 200° more or less of 3,000° F. thereby producing a fusion joinder of the molten iron with the tube and automatically forming annular ribs around the tube pressed by the molten iron into the grooves of the mold, and cutting the tube and the iron lining therefore transversely into sections, each of a width for a brake drum and each section having an outwardly extending annular rib.

5. The method of producing brake drums which consists in lining an elongated tube having outwardly extending spaced apart annular ribs therearound with a cast iron alloy, the annular ribs being spaced from each other a distance substantially the width of a brake drum, machining the cast iron lining at spaced apart intervals to provide continuous grooves extending entirely through the lining to the tube, said grooves in the lining being spaced from each other a distance equal to approximately the width of two brake drums, cutting the tube transversely at said grooves in the lining midway between the sides of the grooves thereby forming double width brake drum sections, each having an outer supporting shell and a cast iron lining therein and with the shell projecting at each end beyond the lining, and dividing each double width drum section thus produced midway between its ends transversely to provide two single drum rings.

6. The process of producing brake drums consisting of the steps defined in claim 5, forming a back of sheet metal of circular form of a size to fit within the projecting end of the shell and against one end of the lining, and forming said projecting end of the shell inwardly against and over the peripheral portions of said back and permanently securing the same thereto.

7. A method of producing brake drums which consists in providing an elongated tube of thin steel, lining said tube with a cast iron liner, cutting continuous annular spaced apart grooves in the liner and through the same to the tube at distances apart equal substantially to the width of two drums, cutting transversely through the tube at said grooves and midway between the sides of the grooves, thereby providing a cast iron lined tubular section of substantially the width of two drums having at each end a projecting annular extension of the sheet metal tube beyond the lining, and cutting each of said sections transversely midway between its ends.

8. The herein described method which consists in providing a tube of thin metal, placing the tube in a form, said form having depressions therein at its inner side, heating the tube and form, revolving the tube and form about the longitudinal axis of the tube, and depositing in the tube molten metal, whereby the walls of the tube under the temperature imparted thereto by the molten metal and under the pressure of the metal is pressed into the form and shaped thereby, and fills depressions made by shaping the tube to the form.

9. The method of producing brake drums which consists in providing a brake drum mold, locating a tubular brake drum shell therein, said mold having a continuous annular groove at its inner side, heating the shell and mold to high temperatures, rotating the same about the longitudinal axis of the shell, and depositing molten metal heated far above its melting point in the shell while it is rotating to form an intermolecular joinder of the shell and molten metal and press the shell into the groove of the mold, the molten metal filling the groove formed in the shell.

10. The method of producing brake drums which consists in producing a cylindrical tube of metal, the length of which is greater than its diameter, flanging inwardly each of the ends of the tube, placing the tube in a sectional mold, the interior of which is in the form of the outer curved sides of a plurality of brake drum rings positioned end to end, heating the mold and tube to a temperature of at least 700° F., revolving the mold and tube, pouring into the tube molten metal of a temperature sufficiently high to heat the tube to at least 1,500° F., revolving the mold, tube and molten metal at a high speed sufficient to cause the tube to conform to the interior of the mold under the centrifugal pressure of the molten metal, allowing the mold and tube to cool, removing the tube from the mold and cutting the same into brake drum rings, each comprising an outer shell of the metal of the tube and an inner lining of cast metal, and each having at one end a projecting annular portion of the tube extending beyond the end of the lining, forming a supporting back for the brake drum ring, placing the back against the end of the lining and inside said projecting portion inwardly against the peripheral portions of the supporting back and welding the same thereto.

11. The method of producing brake drums which consists in lining a cylindrical steel tube with cast iron, cutting the cast iron lining and the steel tube into a plurality of brake drum ring sections of which the steel tube at a side of the sections projects beyond the cast iron lining, placing a supporting back plate inside of the projecting steel of the tube and bending the steel of the projection against the supporting back whereby the supporting back is secured to the brake ring sections.

12. The method of producing brake drums which consists in lining a cylindrical steel tube with cast iron, cutting the cast iron lining and the steel tube into a plurality of brake drum ring sections of which the steel tube at a side of the section projects beyond the cast iron lining, placing a supporting back plate inside of the projecting steel of the tube and bending the steel of the projection against the supporting back whereby the supporting back is secured to the brake ring sections and joining the steel of the section to the supporting back as by welding.

13. The method of producing a brake drum ring or the like which consists in providing a mold having an interior depression, locating and holding an outer shell of thin metal in said mold, rotating said mold and shell, and depositing a molten alloy in the shell while it is rotating whereby the molten alloy is distributed over the inner face of the shell by centrifugal action, and the shell is deformed into the depression in the mold, as specified.

14. The method of making brake drum ring elements including the steps of forming a cylindrical band, casting an interior lining of metal into said band, severing said band between its ends to form ring portions, and then forming the metal of the band only of each of said portions along the severed edge thereof to provide a sealing element.

15. The method of forming brake ring elements including the steps of forming a sheel metal band, casting a liner into said band, severing said band between its ends to form separate ring elements and removing portions of the liner along the edges at which severing takes place, and then forming the bared edge portions of the ring elements into sealing elements.

16. The method of forming brake drum elements including the steps of forming a cylindrical sheet metal band with radially inwardly directed annular flanges at opposite ends thereof, casting a liner in said band, severing said band between its ends into brake drum elements and removing portions of the liner along the edges at which severing takes place, and then bending the sheet metal portions only along the bared edges thereof to form sealing elements for cooperation with a backing plate.

17. The method of making brake drum ring elements, including the steps of forming a cylindrical band of a length greater than the added widths of two brake drums, casting an interior lining of metal into said band, removing an intermediate portion of the cast lining, severing the cylindrical band at the removed portion of the cast lining whereby brake drum ring elements are made, each having an outer cylindrical band section which projects at one end beyond the adjacent end of the cast metal lining, and then forming the projecting metal of the band into a flange.

18. The method of making brake drum ring elements which includes, the providing of an outer cylindrical steel shell for a plurality of said elements, casting an interior lining of cast iron into said shell, removing a continuous annular portion of the cast iron to the inner side of the band so as to divide the cast iron lining into separate lengths each of the width of a brake drum, severing the steel shell to provide an annular section of the shell to extend beyond the adjacent end of the lining, and then forming the said projecting portion of the shell into a flange.

CHARLES W. DAKE.